United States Patent
Albert et al.

(10) Patent No.: US 10,118,412 B2
(45) Date of Patent: Nov. 6, 2018

(54) SCANNING INKJET PRINTING ASSEMBLY

(71) Applicant: Océ Holding B.V., Venlo (NL)

(72) Inventors: Brian A. J. Albert, Delta (CA); Glen Field, Vancouver (CA); Maarten J. H. Elferink, Vancouver (CA); Matthew Rektor, Delta (CA)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/845,491

(22) Filed: Dec. 18, 2017

(65) Prior Publication Data

US 2018/0170071 A1 Jun. 21, 2018

(30) Foreign Application Priority Data

Dec. 19, 2016 (EP) .................................... 16205156

(51) Int. Cl.
*B41J 11/00* (2006.01)
*B41J 19/14* (2006.01)
(Continued)

(52) U.S. Cl.
CPC ............ *B41J 11/008* (2013.01); *B41J 2/2132* (2013.01); *B41J 11/42* (2013.01); *B41J 11/46* (2013.01);
(Continued)

(58) Field of Classification Search
CPC ........ B41J 2/2132; B41J 11/008; B41J 11/42; B41J 11/46; B41J 19/14; B41J 19/202;
(Continued)

(56) References Cited

U.S. PATENT DOCUMENTS 7,050,193 B1 * 5/2006 Downing ................. B41J 11/42
358/1.1
2003/0058295 A1 * 3/2003 Heiles ..................... B41J 2/2132
347/19
(Continued)

FOREIGN PATENT DOCUMENTS

EP 0 980 762 A2 2/2000
GB 2 319 991 A 6/1998

OTHER PUBLICATIONS

European Search Report issued in EP 16 20 5156, dated Jun. 20, 2017.

*Primary Examiner* — Anh T. N. Vo
(74) *Attorney, Agent, or Firm* — Birch, Stewart, Kolasch & Birch, LLP

(57) ABSTRACT

A scanning inkjet printing method comprises arranging a recording medium on a print surface; moving a carriage supporting at least one inkjet print head over the recording medium on the print surface in a scanning direction, while image-wise applying droplets of a liquid to the recording medium to form a first swath of printed dots on the recording medium; moving the recording medium and the carriage relative to each other in a transport direction, wherein the transport direction is transverse to the scanning direction; moving the carriage over the recording medium on the print surface in the scanning direction, while image-wise applying droplets of the liquid to the recording medium to form a second swath of printed dots on the recording medium; detecting a position of the first swath; determining a sub-carriage movement relative to the carriage in response to the detected position of the first swath to position the second swath relative to the first swath, wherein the sub-carriage is supported by the carriage and the movement comprises an amount of translation in the transport direction transverse to the scanning direction and an amount of rotation around a (Continued)

rotation axis, wherein said rotation axis is perpendicular to the print surface; and moving the sub-carriage in accordance with the determined amount of translation and the determined amount of rotation. Thus, the first and the second swath may be positioned accurately adjacent to reduce visibility of stitching inaccuracies between adjacent swaths.

10 Claims, 5 Drawing Sheets

(51) Int. Cl.
*B41J 19/20* (2006.01)
*H04N 1/12* (2006.01)
*H04N 1/191* (2006.01)
*B41J 11/42* (2006.01)
*B41J 11/46* (2006.01)
*B41J 2/21* (2006.01)

(52) U.S. Cl.
CPC .............. *B41J 19/14* (2013.01); *B41J 19/202* (2013.01); *B41J 19/205* (2013.01); *H04N 1/12* (2013.01); *H04N 1/128* (2013.01); *H04N 1/1911* (2013.01); *H04N 1/1912* (2013.01)

(58) Field of Classification Search
CPC ......... B41J 19/205; H04N 1/12; H04N 1/128; H04N 1/1911; H04N 1/1912
See application file for complete search history.

(56) References Cited

U.S. PATENT DOCUMENTS

| 2006/0197801 | A1  | 9/2006 | Hashii et al. |
| 2007/0153035 | A1* | 7/2007 | Jung ..................... B41J 2/155 347/9 |
| 2008/0007762 | A1* | 1/2008 | Robertson ................ B41J 3/36 358/1.15 |
| 2009/0189948 | A1  | 7/2009 | Nakata |

* cited by examiner

SCANNING INKJET PRINTING ASSEMBLY

FIELD OF THE INVENTION

The present invention generally pertains to a scanning inkjet printing assembly and in particular to an inkjet printing assembly comprising a scanning carriage with a sub-carriage, wherein the sub-carriage is moveable relative to the scanning carriage at least in a direction transverse to a scanning direction and around an axis perpendicular to the scanning direction.

BACKGROUND ART

It is known to have a scanning inkjet printing assembly has a print surface on which a recording medium can be arranged. For printing, a carriage supporting at least one inkjet print head is moved over the recording medium on the print surface in a scanning direction, while image-wise applying droplets of a liquid to the recording medium to form a first swath of printed dots on the recording medium. After completing such swath, which may be after a single scanning movement or after multiple scanning movements, the recording medium and the carriage are moved relative to each other in a transport direction, wherein the transport direction is transverse to the scanning direction. Then, the carriage is moved over the recording medium on the print surface in the scanning direction again, while image-wise applying droplets of the liquid to the recording medium to form a second swath of printed dots on the recording medium. Usually, the second swath is adjacent the first swath to build a printed image on the recording medium by adjacent swaths comprised of printed dots.

A known disadvantage of such a scanning inkjet printing method is that any inaccuracy in the relative movement in the transport direction will lead to inaccurate stitching of the adjacent swaths. If the movement in the transport direction is too small, the adjacent swaths will partly overlap, usually resulting in an undesired dark line in the printed image due to a local excess of a number of printed dots. If the movement in the transport direction is too large, a gap between the adjacent swaths results, which may be visible as a line with the color of the recording medium, which is usually white. So, usually, a white line becomes visible.

In order to increase the stitching accuracy, it is known to provide a sub-carriage on the carriage, wherein the sub-carriage is moveable in the transport direction relative to the carriage. The at least one print head is arranged on the sub-carriage. An inaccuracy in the relative movement in the transport direction of the carriage and the recording medium is then compensable by translating the sub-carriage relative to the carriage in the transport direction.

In practice, inaccuracies may not only be an imperfect step-wise movement. For example, if the recording medium is a web and the recording medium is step-wise moved in the transport direction, the recording medium may deform slightly resulting in a curved first swath. If a gantry moveably supporting the carriage is moved, the gantry may rotate slightly and thus the scanning direction becomes slanted relative to the first swath.

Translating the sub-carriage relative to the carriage in the transport direction cannot resolve such stitching inaccuracies. For example, with a curved swath edge, a straight edge of an adjacent swath cannot be accurately adjacent over the width of the swath. The same applies in case of a swath slanted relative to the previous swath.

It is desirable to have a scanning inkjet printing method and corresponding inkjet printing assembly improving a stitching accuracy between any two adjacent swaths.

SUMMARY OF THE INVENTION

In a first aspect of the present invention, a scanning inkjet printing method according t claim 1 is provided. The scanning inkjet printing method comprises arranging a recording medium on a print surface; moving a carriage supporting at least one inkjet print head over the recording medium on the print surface in a scanning direction, while image-wise applying droplets of a liquid to the recording medium to form a first swath of printed dots on the recording medium; moving the recording medium and the carriage relative to each other in a transport direction, wherein the transport direction is transverse to the scanning direction; moving the carriage over the recording medium on the print surface in the scanning direction, while image-wise applying droplets of the liquid to the recording medium to form a second swath of printed dots on the recording medium; detecting a position and orientation of the first swath; determining a sub-carriage movement relative to the carriage in response to the detected position of the first swath to position the second swath relative to the first swath, wherein the sub-carriage is supported by the carriage and the movement comprises an amount of translation in the transport direction transverse to the scanning direction and an amount of rotation around a rotation axis, wherein said rotation axis is perpendicular to the print surface; and moving the sub-carriage in accordance with the determined amount of translation and the determined amount of rotation.

In the method according to the present invention, a translational and rotational position of the sub-carriage is controlled for printing the second swath to match a position of the first swath. While the rotational position may be adapted to a rotational position of the first swath, more importantly, the rotational position of the sub-carriage may be employed to smooth a translational movement of the sub-carriage for preventing print artifacts due to such translational movement, as is shown in and explained in more detail in relation to FIGS. 4A, 4B and 5 hereinafter. In particular, in an embodiment, in which multiple print heads are provided and arranged in a scanning direction, a purely translational movement results in different positions of the translational movement, as seen in the scanning direction, for each print head. Such different positions will be most likely visible in the printed image as a print artifact. Instead of purely translating, a combined rotation and translation will smooth such a translational transition.

In an embodiment, the step of moving the carriage over the recording medium in the scanning direction, while image-wise applying droplets of the liquid to the recording medium to form a first swath of printed dots on the recording medium comprises applying droplets of the liquid to form position markers. In this embodiment, the step of detecting the position of the first swath comprises detecting a position of at least one of such position markers. Using dedicated position markers ensures that the method is correctly and accurately performed independent from an image being printed. Known suitable position markers are markers provided with yellow ink in thin lines. Such yellow thin lines are essentially invisible to the human vision when normally viewing the printed image due to the limited contrast to a white recording medium. Of course, if the recording medium is not white, a different color may be selected such that a contrast with the recording medium is limited. A commonly known sensor unit may be applied in the inkjet printing assembly for optically detecting such a position marker, wherein the contrast between recording medium and position marker may be enhanced either by the optical system or in image processing. Of course, any other kind of position marker may be employed instead. For example, a part of the second swath may be already printed in the first swath and its position may be detected during printing of the complete second swath. Other suitable methods and markers are well known in the art and it is deemed within the ambit of the skilled person to select such a method and marker for detecting a position of the first swath.

In an embodiment, the step of detecting the position of the first swath, the step of determining an amount of rotational and translational movement and accordingly moving the sub-carriage are repeated, while applying the second swath of printed dots. Thus, while moving the carriage in the scanning direction for printing the second swath, the sub-carriage is regularly, preferably virtually continuously rotated and translated in accordance with a locally detected position of the first swath. Thus, a best possible stitching between the first swath and the second swath maybe obtained.

In an embodiment, in a first execution of the step of determining an amount of rotational and translational movement, which is usually after a first detection of the position of the first swath in a first execution of the step of detecting the position of the first swath, only an amount of translation is determined and the amount of rotation is predetermined to be zero. With a single detection of the position, it is not reliable—if at all possible—to determine a suitable rotation. Moreover, such a first execution is performed after a step-wise relative movement between the recording medium and the carriage. Thus, it may be presumed that any inaccuracy is primarily related to an inaccuracy in the step-wise movement, which is best corrected by a translational movement of the sub-carriage. Since no dots have been applied, there is no need for concern about a print artifact occurring due to such a sudden translational movement. Hence, no rotational movement is needed or desired, when commencing the application of the dots of the second swath.

In an embodiment, the amount of rotation is determined as a rotation around a predetermined center of rotation of the sub-carriage and the amount of translation is determined taking into account the determined amount of rotation. Applying the rotation will include a translational movement, if a position of the center of rotation and a position of detecting the position of the first swath are different positions (e.g. position of an optical sensor on the sub-carriage not arranged in the center of rotation). Therefore, it is in general most convenient to first determine an amount of rotation around the center of rotation and then determining an amount of translation taking into account a translational movement induced by the rotational movement.

In an embodiment, the position detection is performed by application of an optical sensor provided on the sub-carriage and the amount of rotation and the amount of translation are determined taking the optical sensor as an origin for the sub-carriage movement. Since any deviations from a desired position are detected by the sensor at the position of the sensor, it is most convenient to determine any translational and rotational corrections with the sensor position as an origin.

In an embodiment, the method further comprises an initial step of calibrating a guide structure, the guide structure moveably supporting the carriage for the carriage movement in the scanning direction. The initial step of calibrating comprises determining a carriage trajectory, wherein the carriage trajectory defines a calibration amount of translation and a calibration amount of rotation along the guide structure relative to a predetermined virtual straight line extending in the scanning direction. Such a calibration amount of translation and of rotation allows at least in a first swath to use the sub-carriage to provide for a straight first swath. Further, in a second and further swath, the calibration amounts may be used to anticipate future sub-carriage movements due to non-straightness of the guide structure, thereby controlling the movement of the sub-carriage as good as possible in accordance with the previous swath. Deviations due to non-straightness of the guide structure may thus be compensated by the use of the sub-carriage.

In an embodiment, the step of moving the sub-carriage further comprises adding a noise contribution, i.e. a signal of subsequent random values, to at least one of the determined amount of translation and the determined amount of rotation in order to reduce visibility of structure and/or banding in a resulting printed image. Small random variations in movement of the sub-carriage result in small random variations in dot placements. Such small random variations are less visible to the human vision compared to regular variations which tend to be clearly visible. So, adding a random contribution aids in reducing visible print artifacts due to the scanning movement of the (sub-)carriage.

In a particular embodiment, the sub-carriage movement is controlled with a closed-loop servo controlled system and the noise contribution is determined by the steps of deriving a mathematical model of the sub-carriage mechanical system; designing a mathematical filter based on a frequency response of the mathematical model; generating a noise signal; deriving a noise contribution by filtering the noise signal using the mathematical filter; and adding the noise contribution to at least one of the determined amount of translation and the determined amount of rotation. Thus, a very suitable random noise contribution may be obtained for obfuscating any regular deviations due to scanning movement.

In a further aspect, the present invention provides for a scanning inkjet printing assembly. The scanning inkjet printing assembly comprises a print surface for holding a recording medium; a guide structure extending over the print surface, the guide structure and the recording medium being moveable relative to each other in a transport direction; a carriage moveably supported on the guide structure and supporting at least one inkjet print head, wherein the carriage is moveable over the print surface in a scanning direction for applying droplets of a liquid to the recording medium to form a swath of printed dots on the recording medium, the scanning direction being transverse to the transport direction; a sub-carriage supported by the carriage, the sub-carriage being moveable relative to the carriage at least in the transport direction and rotatable around a rotation axis perpendicular to the print surface; a control unit operatively coupled to the carriage and the sub-carriage for controlling the movement of the carriage and the sub-carriage; and a sensor unit operatively coupled to the control unit for detecting a position of a previously applied swath of printed dots. Further, the control unit is configured to control the sub-carriage to adapt the swath being applied to the previously applied swath by translating the sub-carriage relative to the carriage in the transport direction and rotating the sub-carriage relative to the carriage around the rotation axis in accordance with the method according to the present invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein.

DETAILED DESCRIPTION OF THE DRAWINGS

Figure 1A:
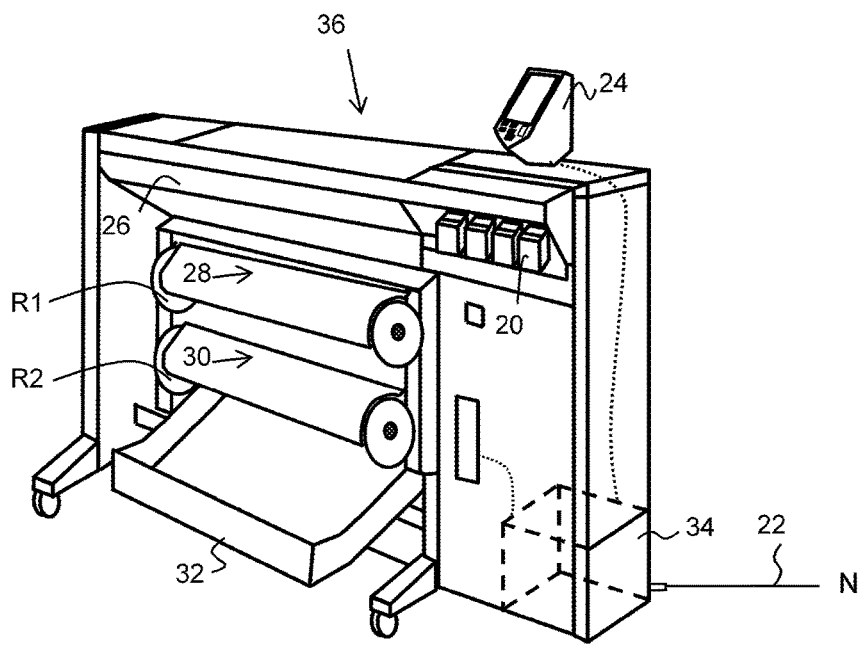
FIG. 1A is a perspective view of an embodiment of an inkjet printing assembly.

The present invention will now be described with reference to the accompanying drawings, wherein the same reference numerals have been used to identify the same or similar elements throughout the several views.

Figure 1B:
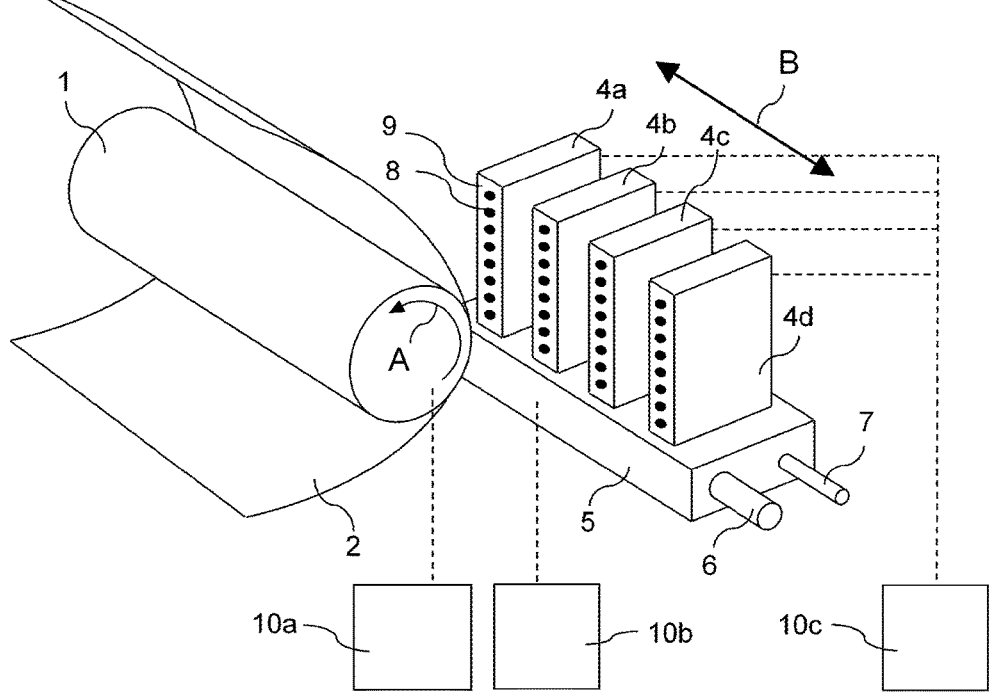
FIG. 1B is a schematical representation of an embodiment of a scanning inkjet printing assembly.

FIG. 1A shows an image forming apparatus 36, in particular an inkjet printer, wherein printing is achieved using a wide-format inkjet printing assembly. The wide-format image forming apparatus 36 comprises a housing 26, wherein the printing assembly, for example the ink jet printing assembly shown in FIG. 1B is placed. The image forming apparatus 36 also comprises a storage means for storing image receiving member 28, 30 (also referred to as a recording medium), a delivery station to collect the image receiving member 28, 30 after printing and storage means for marking material 20. In FIG. 1A, the delivery station is embodied as a delivery tray 32. Optionally, the delivery station may comprise processing means for processing the image receiving member 28, 30 after printing, e.g. a folder or a puncher. The wide-format image forming apparatus 36 furthermore comprises means for receiving print jobs and optionally means for manipulating print jobs. These means may include a user interface unit 24 and/or a control unit 34, for example a computer.

Images are printed on an image receiving member, for example paper, supplied by a roll 28, 30. The roll 28 is supported on the roll support R1, while the roll 30 is supported on the roll support R2. Alternatively, cut sheet image receiving members may be used instead of rolls 28, 30 of image receiving member. Printed sheets of the image receiving member, cut off from the roll 28, 30, are deposited in the delivery tray 32.

Each one of the marking materials for use in the printing assembly are stored in four containers 20 arranged in fluid connection with the respective print heads for supplying marking material to said print heads.

The local user interface unit 24 is integrated to the print engine and may comprise a display unit and a control panel. Alternatively, the control panel may be integrated in the display unit, for example in the form of a touch-screen control panel. The local user interface unit 24 is connected to a control unit 34 placed inside the printing apparatus 36. The control unit 34, for example a computer, comprises a processor adapted to issue commands to the print engine, for example for controlling the print process. The image forming apparatus 36 may optionally be connected to a network N. The connection to the network N is diagrammatically shown in the form of a cable 22, but nevertheless, the connection could be wireless. The image forming apparatus 36 may receive printing jobs via the network. Further, optionally, the controller of the printer may be provided with a USB port, so printing jobs may be sent to the printer via this USB port.

FIG. 1B shows an ink jet printing assembly 3. The ink jet printing assembly 3 comprises supporting means for supporting an image receiving member 2. The supporting means are shown in FIG. 1B as a platen 1, but alternatively, the supporting means may be a flat surface. The platen 1, as depicted in FIG. 1B, is a rotatable drum, which is rotatable about its axis as indicated by arrow A. The supporting means may be optionally provided with suction holes for holding the image receiving member in a fixed position with respect to the supporting means. The ink jet printing assembly 3 comprises print heads 4a-4d, mounted on a scanning print carriage 5. The scanning print carriage 5 is guided by suitable guiding means 6, 7 to move in reciprocation in the main scanning direction B. Each print head 4a-4d comprises an orifice surface 9, which orifice surface 9 is provided with at least one orifice 8. The print heads 4a-4d are configured to eject droplets of marking material onto the image receiving member 2. The platen 1, the carriage 5 and the print heads 4a-4d are controlled by suitable controlling means 10a, 10b and 10c, respectively.

The image receiving member 2 may be a medium in web or in sheet form and may be composed of e.g. paper, cardboard, label stock, coated paper, plastic or textile. Alternatively, the image receiving member 2 may also be an intermediate member, endless or not. Examples of endless members, which may be moved cyclically, are a belt or a drum. The image receiving member 2 is moved in the sub-scanning direction A by the platen 1 along four print heads 4a-4d provided with a fluid marking material.

A scanning print carriage 5 carries the four print heads 4a-4d and may be moved in reciprocation in the main scanning direction B parallel to the platen 1, such as to enable scanning of the image receiving member 2 in the main scanning direction B. Only four print heads 4a-4d are depicted for demonstrating the invention. In practice an arbitrary number of print heads may be employed. In any case, at least one print head 4a-4d per color of marking material is to be placed on the scanning print carriage 5. For example, for a black-and-white printer, at least one print head 4a-4d, usually containing black marking material is present. Alternatively, a black-and-white printer may comprise a white marking material, which is to be applied on a black image-receiving member 2.

For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6, 7. These guiding means 6, 7 may be rods as depicted in FIG. 1B. The rods may be driven by suitable driving means (not shown). Alternatively, the carriage 5 may be guided by other guiding means, such as an arm being able to move the carriage 5. Another alternative is to move the image receiving material 2 in the main scanning direction B.

Each print head 4a-4d comprises an orifice surface 9 having at least one orifice 8, in fluid communication with a pressure chamber containing fluid marking material provided in the print head 4a-4d. On the orifice surface 9, a number of orifices 8 is arranged in a single linear array parallel to the sub-scanning direction A. Eight orifices 8 per print head 4a-4d are depicted in FIG. 1B, however obviously in a practical embodiment several hundreds of orifices 8 may be provided per print head 4a-4d, optionally arranged in multiple arrays. As depicted in FIG. 1B, the respective print heads 4a-4d are placed parallel to each other such that corresponding orifices 8 of the respective print heads 4a-4d are positioned in-line in the main scanning direction B. This means that a line of image dots in the main scanning direction B may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction. The image dots are formed by ejecting droplets of marking material from the orifices 8.

Upon ejection of the marking material, some marking material may be spilled and stay on the orifice surface 9 of the print head 4a-4d. The ink present on the orifice surface 9, may negatively influence the ejection of droplets and the placement of these droplets on the image receiving member 2. Therefore, it may be advantageous to remove excess of ink from the orifice surface 9. The excess of ink may be removed for example by wiping with a wiper and/or by application of a suitable anti-wetting property of the surface, e.g. provided by a coating.

Figure 1C:
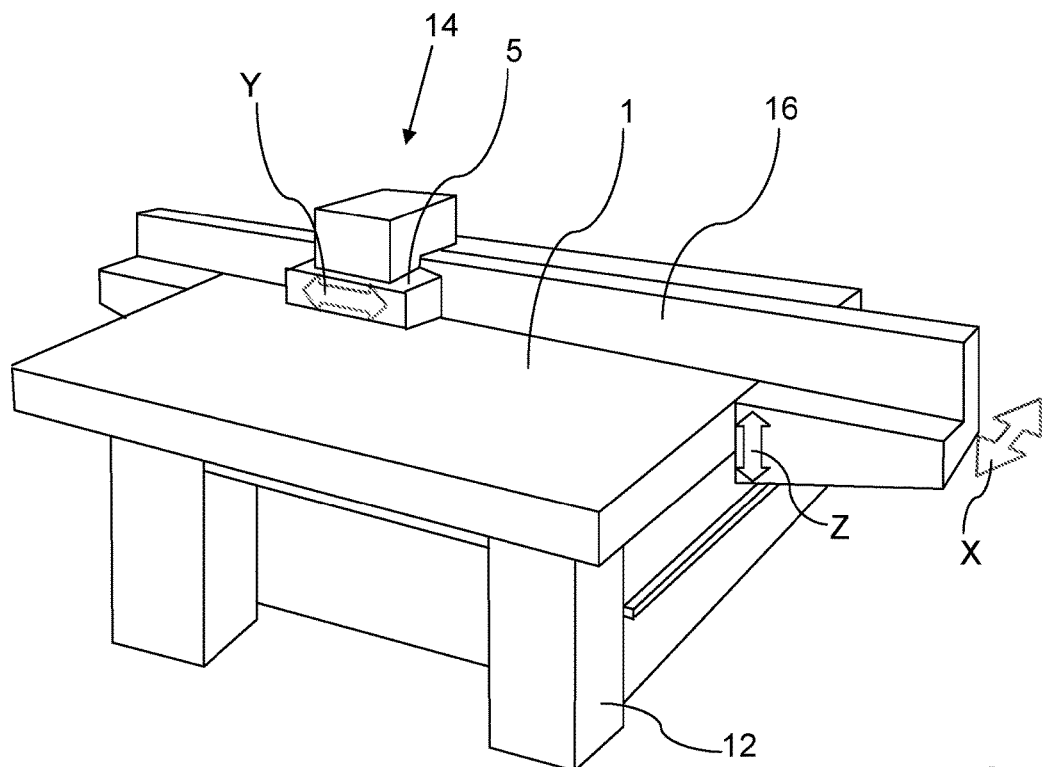
FIG. 1C is a perspective view of another embodiment of an inkjet printing assembly.

FIG. 1C shows another embodiment of an inkjet printing assembly 14 (herein also referred to as a printing apparatus or an inkjet printer), in which the medium support surface 1 is a flat surface. On the flat surface a flexible medium or a non-flexible flat medium may be arranged and may be printed on. The medium support surface 1 is supported on a suitable support structure 12 and a guide beam 16 is arranged over the medium support surface 1. Such guide beam 16 is also known in the art as a gantry. The guide beam 16 supports the print head carriage 5 such that the print head carriage 5 is enabled to scan in a Y-direction. The guide beam 16 is arranged and configured to be enabled to reciprocate in an X-direction, wherein the X-direction is usually substantially perpendicular to the Y-direction. In a known printing apparatus 14, the guide beam 16 is also arranged and configured to be enabled to move in a Z-direction, which is substantially perpendicular to the X-direction and the Y-direction such to enable to adapt the printing apparatus 14 to a thickness of the recording medium being arranged on the medium support surface 1 and/or to be enabled to print multiple layers on top of each other such to generate height differences in a printed image.

While in FIG. 1B the carriage 5 is illustrated to support four print heads 4a-4d, in practice the carriage 5 may support many print heads. For example, more than four colors of liquid marking material (hereinafter also referred to as ink) may be available. A common additional color is white, but also varnish and silver-colored and gold-colored ink are well known additional colors. Further, for increasing a print speed it is known to provide multiple print heads per color. In particular, two or more print heads per color may be staggered to form a wider print swath per scanning movement.

With an increasing number of print heads on the carriage 5, a weight of the carriage 5 increases. Inertia increases and resonance frequencies become lower. A too low resonance frequency is undesirable as such low resonance frequency may be close to an operating frequency. Consequently, such resonance frequency may become excited and distort/disrupt the operation of the inkjet printer. In order for the carriage 5 to support more print heads, it is desirable to reduce the weight of any other component. For example, a carriage plate for supporting the print heads may be reduced in weight by thinning the carriage plate.

Figure 2:
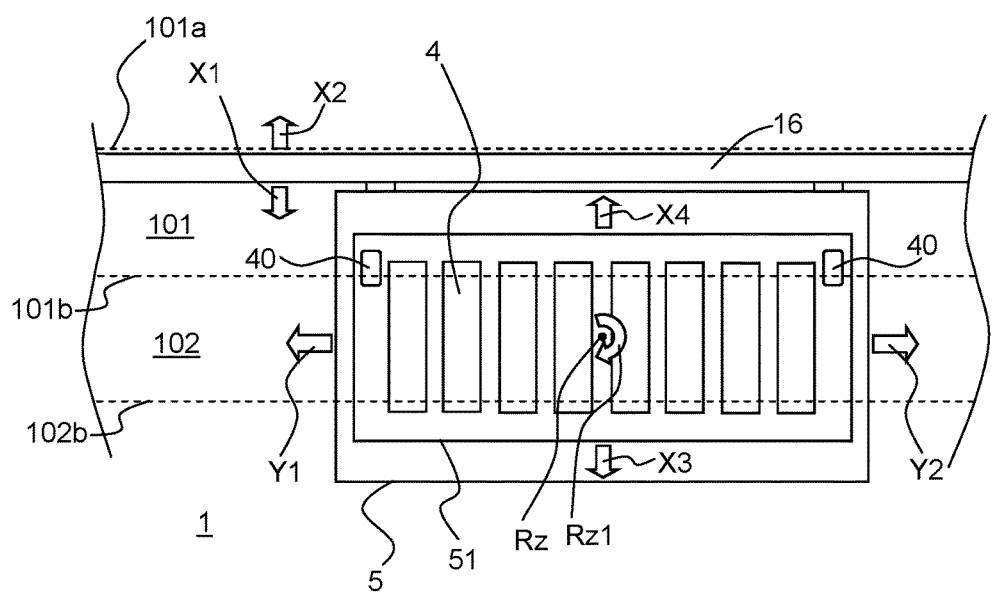
FIG. 2 is a schematical representation of an embodiment of a scanning inkjet print head carriage and sub-carriage in accordance with the present invention.

FIG. 2 illustrates a part of a scanning inkjet printing assembly according to the present invention, which is arranged and configured to perform the method according to the present invention. In particular, the embodiment of FIG. 2 comprises a medium support surface 1, also referred to herein as the print surface 1, on which an image receiving member, herein also referred to as a recording medium, may be arranged. The guide beam 16 extends over the print surface 1 and the carriage 5 is moveably supported thereon. Please note that FIG. 2 illustrates a guide beam as illustrated in the embodiment of FIG. 1C, the guide beam 16 may be replaced by the guide means 6,7 as illustrated in the embodiment of FIG. 1B. Moreover, the assembly and the method according to the present invention may be employed in both embodiments.

The carriage 5 supports a sub-carriage 51 and the sub-carriage 51 supports—in the illustrated embodiment—eight print heads 4, but the present invention is in no way limited to a specific number of print heads. Further, the sub-carriage 51 supports—in this embodiment—two optical sensor units 40, one on either side of the array of print heads such that at least one optical sensor unit 40 is available upstream of the array of print heads 4 during printing. Hence, if the scanning printing assembly is configured to print only when the carriage 5 is moving in one direction, it suffices to have a single optical sensor unit 40 upstream of the print heads 4. Further, more optical sensor units 40 may be provided as well, for example in order to improve a detection accuracy. It is noted that, in another embodiment, the optical sensor units may be arranged on the carriage 5 or a sensor unit 40 may be supported directly on the guide beam 16. In the latter embodiment, the sensor unit 40 may be moveably supported or a sensor unit 40 extending over the full width of the guide beam 16 (in particular in the Y-axis direction as defined in FIG. 1C) may be statically arranged thereon. An advantage of providing the sensor units 40 on the sub-carriage 51 is the fact that a position of the sensor units 40 is directly coupled to a position of the print heads 4, which ensures that a detection of a position of a first swath by the sensor units 40 is easily coupled and related to the position of the print heads 4. Further, it is noted that the sensor units 40 are not restricted to optical sensor units, although optical sensor units 40 may be deemed most apparently suitable kind of sensor units. However, any other kind of sensor capable of detecting a position of a previous swath is contemplated as well.

As described in relation to FIG. 1C, the guide beam 16 is moveably supported and may be controlled to move either in a first beam direction X1 or a second beam direction X2. The carriage 5 is arranged to be moveable in a first carriage direction Y1 and a second carriage direction Y2. The sub-carriage 51 is moveably supported such to be controllably moved in a first sub-carriage direction X3 or a second sub-carriage direction X4 and such to be controllably moved in a sub-carriage rotation direction Rz1 around a rotation axis Rz (also referred to herein as a center of rotation) extending in the Z-direction as defined in FIG. 1C. Although the center of rotation Rz is illustrated in a geometric center of the sub-carriage 51, a center of rotation in another embodiment may be selected to be arranged on any other suitable location.

Two adjacent swaths, a first swath 101 and a second swath 102, are depicted by three dashed lines: a first swath trailing edge 101a, a first swath leading edge 101b and a second swath leading edge 102b. A second swath trailing edge coincides with the first swath leading edge 101b and is thus not separately indicated in FIG. 2.

In the embodiment of FIG. 2, the first swath 101 may be presumed to have been printed in a previous scanning movement of the carriage 5, after which the guide beam 16 has been moved step-wise in the first beam direction X1. The second swath 102 is being printed adjacent to the first swath 101. A swath width corresponds to a width of the print heads 4 and in this example perfectly straight swaths 101 and 102 are printed accurately adjacent to each other.

The sensor units 40 may be employed to detect the first swath leading edge 101b after the guide beam 16 has stepped in the first beam direction X1 (or the second beam direction X2, mutatis mutandis). Based on the detected first swath leading edge 101b, the sub-carriage 51 may be moved in the first sub-carriage direction X3 or the second sub-carriage direction X4 to correct for any inaccuracy of the step-wise movement of the guide beam 16. This method is shown in FIGS. 3A and 3B in more detail.

Figure 3A:
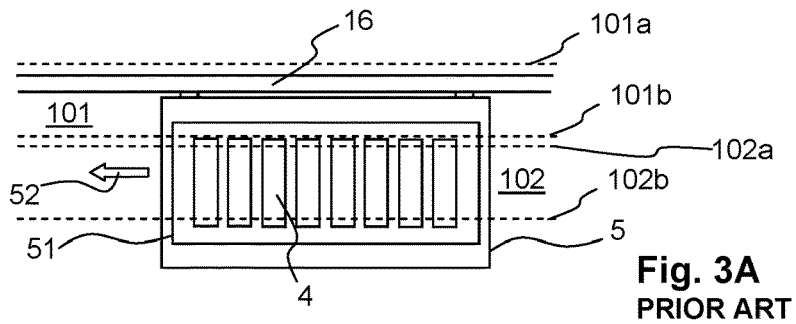
FIGS. 3A and 3B are schematical representations of a prior art embodiment of a scanning inkjet carriage and sub-carriage.

FIG. 3A shows the sub-carriage 51 in a centered position with respect to the carriage 5. In other words, it is presumed that the sub-carriage 51 has not yet been moved relative to the carriage 5 and is scanning in a scanning direction 52 for applying the second swath 102. It is presumed that the guide beam 16 has previously stepped in the first beam direction X1, but the step made was larger than intended. Consequently, the print heads 4 are positioned such that a second swath trailing edge 102a does not coincide with the first swath leading edge 101b. A gap remains between the first swath 101 and the second swath 102. If the recording medium 2 is white, the gap will appear as a white stripe in the resulting printed image and hence will be considered a print artifact. Please note that a shorter step of the guide beam 16 would have resulted in the first swath 101 and the second swath 102 partly overlapping (not shown), which will be visible as a dark stripe, which is likewise considered to be a print artifact.

Figure 3B:
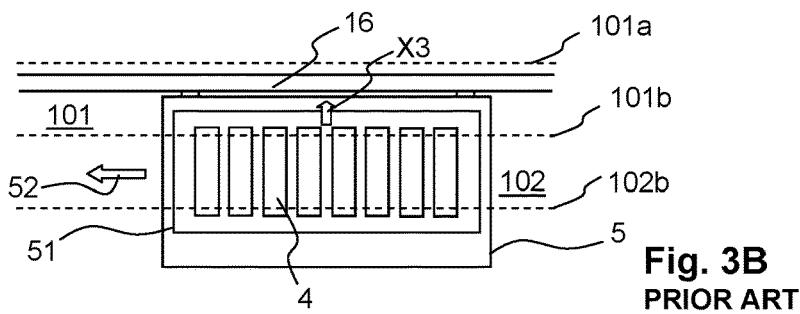

With reference to FIG. 3B, the sub-carriage 51 is moved in the second sub-carriage direction X4—compared to the situation as illustrated in FIG. 3A—with an amount suitable to let the second swath trailing edge 102a and the first swath leading 101b coincide such that the first swath 101 and the second swath 102 are adjacent and no stripe will become visible in the resulting printed image. It is remarked that the use of a sub-carriage 51 for correcting a transport step of the guide beam 16 (or similarly the recording medium 2 in the embodiment of FIG. 1B) is known from the prior art.

Figure 4A:
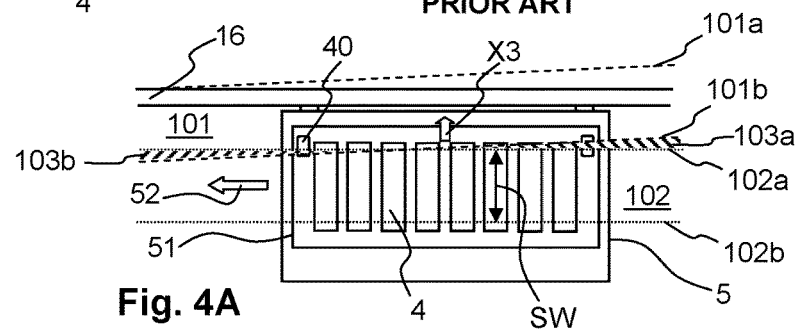
FIGS. 4A and 4B are schematical representations of an embodiment of a scanning inkjet carriage and sub-carriage according to the present invention.

FIG. 4A illustrates an embodiment of the method according to the present invention, wherein a direction in which the first swath leading edge 101b of the first swath 101 is not aligned with the scanning direction 52 of the carriage 5. In other words, the scanning direction and a first swath direction are at an angle. Moving the sub-carriage 51 in the second sub-carriage direction X4 may adapt to a local difference between the first swath leading edge 101b and the second swath trailing edge 102a, but when scanning in the scanning direction 52, the triangular areas 103a and 103b will become visible in the resulting printed image. In particular, a first triangular area 103a is formed by a gap between the first swath leading edge 101b and the second swath trailing edge 102a, which will appear as an area having the color of the recording medium 2, usually white. A second triangular area 103b is formed by the first swath 101 and the second swath 102 partly overlapping and hence the second triangular area 103b will appear as a dark area.

Figure 4B:
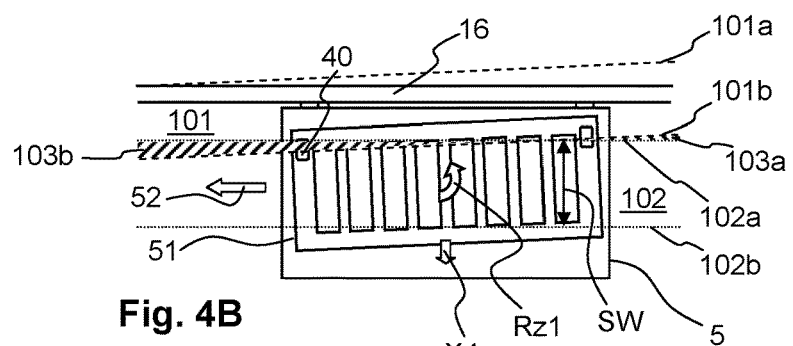

FIG. 4B illustrates the same embodiment as in FIG. 4A with the addition that the sub-carriage 51 is not only moved (translated) in one of the first and second sub-carriage beam directions X3, X4, but is also rotated in the sub-carriage rotation direction Rz1. Thus, the orientation of the print heads 4 may be controlled to be aligned with the first swath direction, i.e. the direction in which the first swath leading edge 101b extends. Now driving the carriage 5 in the scanning direction 52 does not result in the first swath 101 and the second swath 102 being arranged accurately adjacent. Instead, the second swath 102 is still arranged and extending in the scanning direction 52 and, even worse, a swath width SW has increased compared to the situation illustrated in FIG. 4A. The increase in swath width SW inevitably includes a lower dot resolution (number of dots per unit length) and more in particular a different dot resolution in the swath width direction of the second swath 102 compared to the dot resolution of the first swath 101, which will appear as a different ink coverage and hence as a lighter band in the resulting printed image, which will be perceived as a print artifact. Further, there will still be a first triangular area 103a (gap) and a second triangular area 103b (overlap area) which will also be perceived as print artifacts.

While the sub-carriage movement and positioning of the embodiment of FIG. 3B may be performed without a sensor unit for detecting the position of the first swath 101 by, for example, monitoring the movement of the guide beam 16 and/or the movement of the recording medium 2 during the step-wise movement in the transport direction (e.g. first and second beam directions X1 and X2), adjusting to the slanting of the first swath 101 compared to the scanning direction 52 requires the sensor unit 40 and active control of the sub-carriage position to ensure that the print heads 4 apply the second swath 102 of dots adjacent to the first swath 101. By tracking, for example, the first swath leading edge 101b with the sensor unit 40, in particular the sensor unit 40 arranged upstream of the print heads 4, a control unit is enabled to virtually continuously move (translate and/or rotate) the sub-carriage 51 such to achieve the best possible fit between the first swath 101 and the second swath 102. For example, if the first swath 101 is straight, it suffices to rotate the sub-carriage 51 an amount corresponding to the slanting angle between the first swath 101 and the scanning direction 52 and, during scanning movement, translate the sub-carriage 51 in the transport direction. In the situation shown in FIG. 4B, this means that the sub-carriage 52 is continuously translated in the first sub-carriage direction X3 in response to the detected position of the first swath 101.

Figure 5:
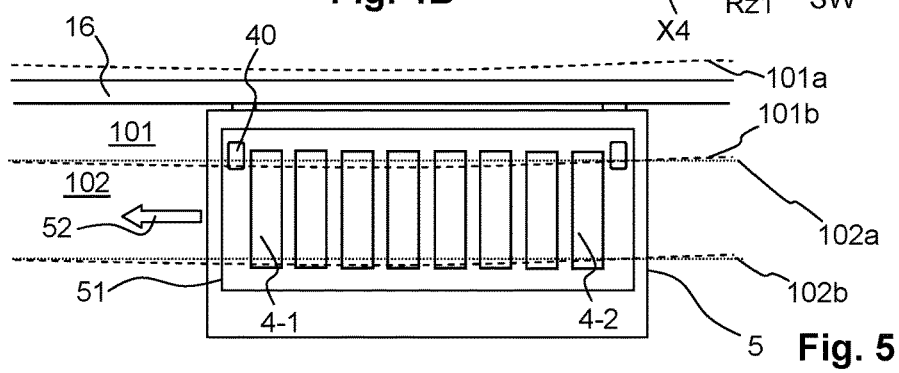
FIG. 5 is a schematical representation of an embodiment of a scanning inkjet carriage and sub-carriage according to the present invention.

As illustrated by FIG. 5, the situation and corresponding control method become even more challenging, if the first swath 101 is not straight. This may for example occur in the embodiment of FIG. 1B, wherein the recording medium 2 is transported underneath the print heads 4. With a relatively wide and flexible recording medium 2, the transport of the medium 2 may result in deformation of the recording medium 2. The position of such an irregularly shaped first swath 101 may be tracked by the sensor unit 40 and the sub-carriage 51 may be driven to translate and rotate in accordance with the position detected by the sensor unit 40. This will however not result in a nice stitching of the first swath 101 and the second swath 102. In particular, it needs to be considered that the sensor unit 40 is located at a different position than each print head 4. Moreover, the respective print heads 4 have different positions and would therefore require respective position adaptations. For example, a first print head 4-1 is located near the upstream sensor unit 40, while a second print head 4-2 is located at a position farther away from the sensor unit 40. Due to the curved shape of the first swath leading edge 101b, it may be determined that the sub-carriage 51 should be translated in the second sub-carriage direction X4. Such a translation will however translate the first print head 4-1 at a different position along the scanning direction 52 compared to the second print head 4-2. Assuming that the first and the second print heads 4-1, 4-2 provide dots with different colors, a color-to-color artifact will become visible in the resulting printed image. To minimize the color-to-color artifacts, it is contemplated to not only translate but also to rotate the sub-carriage 51 by an amount to be determined on the basis of the detected position of the first swath 101. An embodiment of a suitable method is elucidated with reference to FIG. 6.

Figure 6:
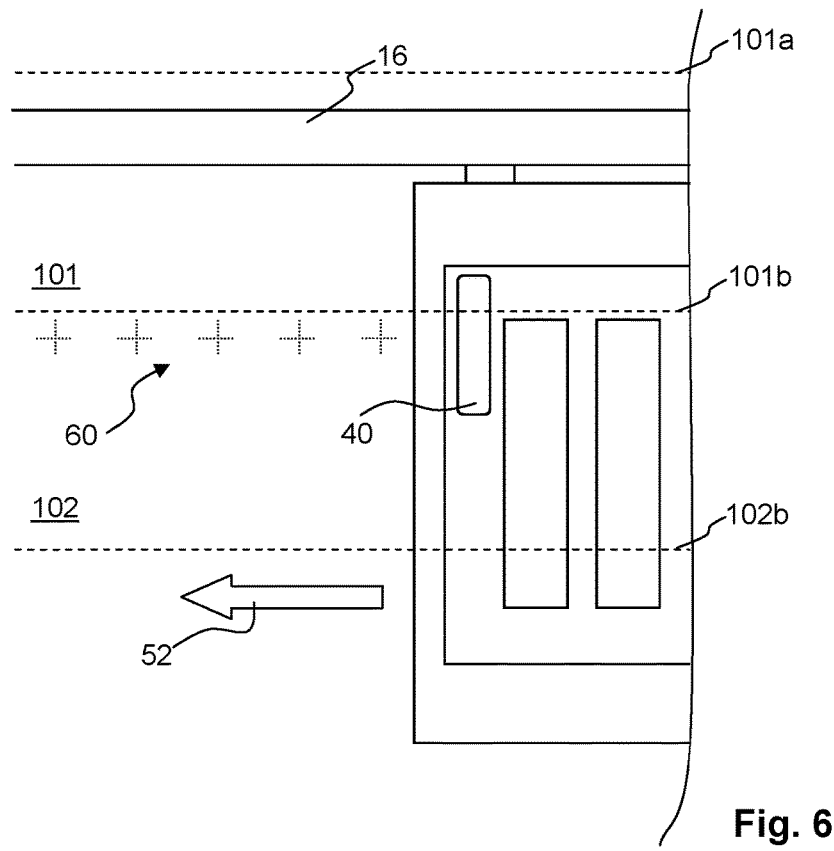
FIG. 6 is a schematical representation of an embodiment of a scanning inkjet carriage and sub-carriage according to the present invention.

In the embodiment of FIG. 6, it is presumed that the first swath 101 has been applied. For ease of illustration, the first swath 101 is shown as straight, while in practice the first swath 101 may be slanted and/or curved. While the first swath 101 of printed dots was being applied, the print heads 4 applied also an array of position markers 60 just next to the first swath leading edge 101b. While scanning movement of the carriage 5 to apply the dots of the second swath 102, the sensor unit 40 optically senses the area next to the first swath leading edge 101b to detect the position of the position markers 60. Thereto, an image signal may be generated by the sensor unit 40 and the image signal may be supplied to an image processor, which may be incorporated in a control unit (not shown). With each detection of a subsequent position marker 60, the control unit may determine a suitable amount of translation and a suitable amount of rotation which amounts are deemed to minimize any print artifacts. Numerous (mathematical) methods are available and known to the skilled person for determining (e.g. calculating) such suitable amounts. Such method may be relatively simple. For example, a difference in position between the just detected position marker 60 and a previously detected position marker 60 may be used to determine the amounts. Alternatively, more complex methods may be applied. For example, a number of previously detected position markers 60 may be taken into account. For example, if the sub-carriage 51 has a width (dimension of the sub-carriage 51 in the scanning direction 52) and the width of the sub-carriage 51 extends over e.g. a hundred position markers 60, the method may take the position of such one hundred position markers 60 into account.

When scanning and determining the translation and rotation amounts, it is considered that the center of rotation Rz is offset from the sensor unit 40, although the sensor unit 40 detects the position of the position markers 60 and thus the amount of correction needed is determined at the location of the sensor unit 40. When applying an amount of rotation around the center of rotation Rz, the rotation introduces an amount of translation at the location of the sensor unit 40. In order to enable correction of such translation, it is advantage to first determine the amount of rotation and then determining an amount of translation, thereby taking into account/correcting the amount of translation introduced by the amount of rotation.

Further, it is contemplated that any selected method is preferably adapted to ensure smooth transitions at the positions where the sub-carriage is translated and/or rotated by any amount. Exception to this preference is envisaged at the start of the scanning movement for the second swath. When detecting a first position marker 60 at the start of the scanning movement, any deviation from an expected position may be directly compensated by a translation, since such a deviation may be deemed attributable to an inaccurate step-wise movement of the guide beam 16 or recording medium transport step. Such inaccurate step may be directly and immediately compensated by a corrective translation without rotation, provided that the detection is performed before any dots of the second swath 102 have been applied otherwise the sudden stepping of the sub-carriage 51 may become visible as a print artifact.

A number of position markers 60 along the scanning direction or in other words a number of position markers 60 per unit length in the scanning direction may be selected depending on different requirements. For example, it may be contemplated that a high number of position markers 60 will increase the accuracy. On the other hand, a lower number of position markers 60 will reduce the required computation power. Further, the more position markers are actually printed, the higher the chance that the position markers 60 may become visible in the resulting printed image.

Figure 7:
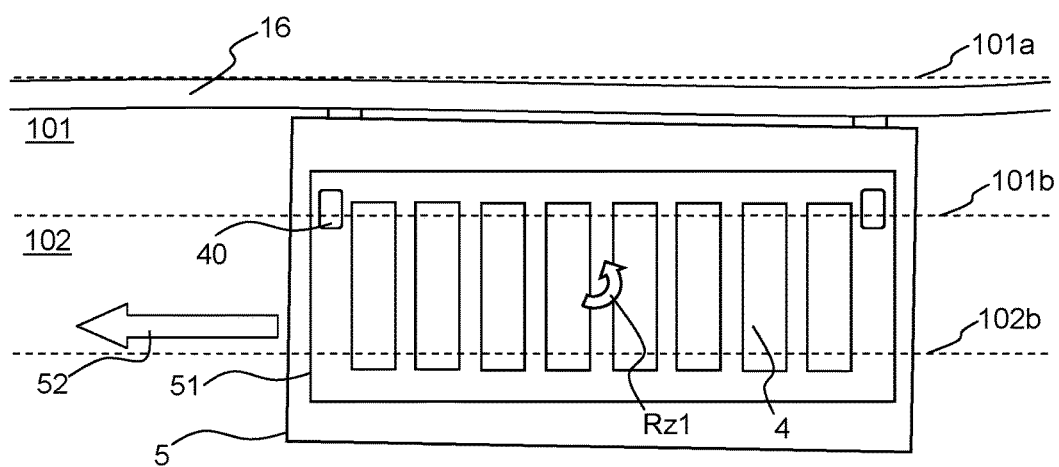
FIG. 7 is a schematical representation of an embodiment of a scanning inkjet carriage and sub-carriage according to the present invention.

FIG. 7 illustrates a further embodiment of the present invention. In the illustrated embodiment, it is assumed that the guide beam 16 is substantially, but not perfectly straight. Consequently, the carriage 5 will not follow a straight path, resulting in a correspondingly curved (i.e. not straight) swath. In accordance with the present invention, the non-straightness of the guide beam 16 may be calibrated by determining the actual shape of such a swath. Based on the calibrated shape, corresponding amounts of translation and rotation may be applied to the sub-carriage 51 based on the a priori known shape. For example, referring to FIG. 7, at a certain position along the guide beam 16, the carriage 5 may be slanted relative to a desired straight swath edge 101*c*. To correct for the slanted orientation of the carriage 5, the sub-carriage may be rotated in the sub-carriage rotation direction Rz1 by such an amount that the sub-carriage 51 is aligned with the desired straight swath edge 101*c*. As above elucidated, such a rotation of the sub-carriage 51 may induce a translation, which may be compensated by another, counteracting translation. The sensor unit 40 may be used during calibration, but during printing the sensor unit 40 is not needed anymore to detect the first swath position for correcting for the non-straightness of the guide beam 16. Still, any other causes may still have resulted in deviations of the first swath shape from the desired straightness and position. So, next to the calibration of the guide beam shape, the method according to the present invention may be applied, wherein any correction for non-straightness of the guide beam 16 may be taken into account. Moreover, whereas a sensor unit 40 arranged on the sub-carriage 51 is only capable of detecting position deviations upon detection and is thus not suitable for predicting future deviations, limiting the correction accuracy, the calibration correction may be adapted to the curving of the guide beam 16 upstream of the carriage 5 during scanning movement.

Figure 8A:
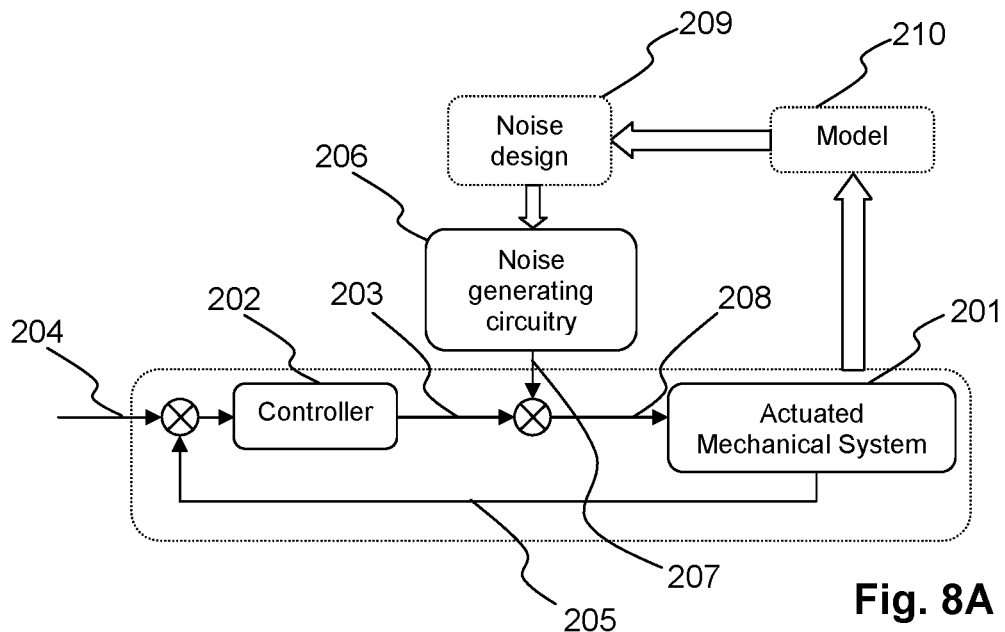
FIGS. 8A and 8B are schematical representations of control circuitry for use in a scanning inkjet printing assembly according to the present invention.
Figure 8B:
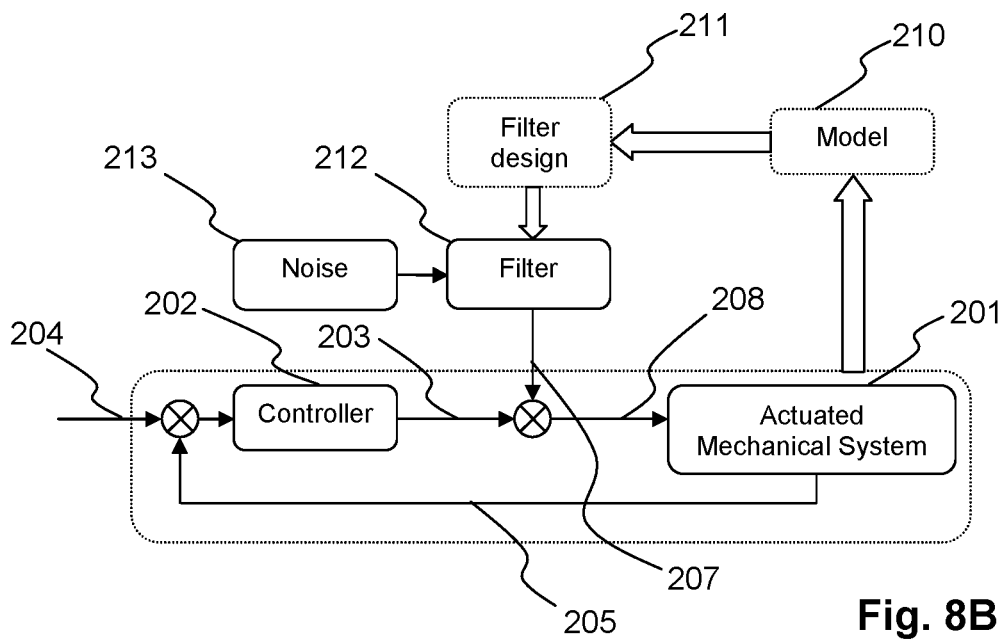

FIGS. 8A and 8B present control circuitry for further reducing visibility of stitching inaccuracy between adjacent swaths. In the illustrated control circuitry, the actuated mechanical system 201 represents at least one of the guide beam, the recording medium transport mechanism, the carriage and the sub-carriage. A controller 202 determines an instruction signal 203 for the actuated mechanical system 201 based on a set point 204 combined with a feedback signal 205 received from the actuated mechanical system 201. This is a common control circuitry which is not further elucidated herein.

An additional circuitry for reducing the visibility of stitching inaccuracies is provided by a noise generating circuitry 206. A noise signal 207 is combined with the instruction signal 203 to provide an adapted instruction signal 208. The adapted instruction signal 208 is actually fed to the actuated mechanical system 201. The added noise will result in minor movements during printing that will smooth sharp transitions, thereby reducing visibility of stitching inaccuracies.

For an optimized result, the noise added by the noise generating circuitry 206 is preferably generated based on a predetermined noise design 209, wherein the noise design 209 is derived from a model 210, e.g. a mathematical model, of the actuated mechanical system 201. With a suitable noise design 209, the added noise may be adapted to the behavior of the actuated mechanical system 201 preventing unexpected and undesired artifacts and optimizing the reduction of visible stitching artifacts.

FIG. 8B shows a particular embodiment in which the noise design 209 and the noise generating circuitry 206 have been embodied as a filter design 211, based on which a noise filter 212 is generated. The noise filter 212 receives predetermined noise 213, such as standard white noise, for example, and filters the noise 213 to generate the noise signal 207 in accordance with the noise design 209.

It is noted that the control circuitry and corresponding method of reducing of visible stitching artifacts as presented in and described in relation to FIGS. 8A and 8B may also be employed apart from the swath tracking and correction method according to the invention as presented herein.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims is herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, such a reference to a structural element encompasses a computer readable medium carrying such computer executable instructions.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A scanning inkjet printing method, the scanning inkjet printing method comprising
   a) arranging a recording medium on a print surface;
   b) moving a carriage supporting at least one inkjet print head over the recording medium on the print surface in a scanning direction, while image-wise applying droplets of a liquid to the recording medium to form a first swath of printed dots on the recording medium;
   c) moving the recording medium and the carriage relative to each other in a transport direction, wherein the transport direction is transverse to the scanning direction;
   d) moving the carriage over the recording medium on the print surface in the scanning direction, while image-wise applying droplets of the liquid to the recording medium to form a second swath of printed dots on the recording medium;
   e) detecting a position of the first swath;
   f) determining a sub-carriage movement relative to the carriage in response to the detected position of the first swath to position the second swath relative to the first swath, wherein the sub-carriage is supported by the carriage and the movement comprises an amount of translation in the transport direction transverse to the scanning direction and an amount of rotation around a rotation axis, wherein said rotation axis is perpendicular to the print surface; and
   g) moving the sub-carriage in accordance with the determined amount of translation and the determined amount of rotation.

2. The method according to claim 1, wherein step b comprises applying droplets of the liquid to form position markers and wherein step e comprises detecting a position of the position markers provided in step b.

3. The method according to claim 1, wherein steps e, f and g are repeated, while executing step d.

4. The method according to claim 3, wherein in a first execution of step f, after a first detection of the position of the first swath in a first execution of step e, only an amount of translation is determined and the amount of rotation is predetermined to be zero.

5. The method according to claim 1, wherein in step f the amount of rotation is determined as a rotation around a predetermined center of rotation of the sub-carriage and the amount of translation is determined taking into account the determined amount of rotation.

6. The method according to claim 1, wherein step e is performed by application of an optical sensor provided on the sub-carriage and the amount of rotation and the amount of translation are determined taking the optical sensor as an origin for the sub-carriage movement.

7. The method according to claim 1, wherein the method further comprises an initial step of calibrating a guide structure, the guide structure moveably supporting the carriage for the carriage movement in the scanning direction and wherein the initial step of calibrating comprises determining a carriage trajectory, wherein the carriage trajectory defines a calibration amount of translation and a calibration amount of rotation along the guide structure relative to a predetermined virtual straight line extending in the scanning direction.

8. The method according to claim 1, wherein a step g further comprises adding a noise contribution to at least one of the determined amount of translation and the determined amount of rotation in order to reduce visibility of structure and/or banding in a resulting printed image.

9. The method according to claim 8, wherein the sub-carriage movement is controlled with a closed-loop servo controlled system and wherein the noise contribution is determined by the steps of g1. deriving a mathematical model of the sub-carriage mechanical system;
g2. designing a mathematical filter based on a frequency response of the mathematical model derived in step g1;
g3. generating a noise signal;
g4. deriving a noise contribution by filtering the noise signal generated in step g3 using the mathematical filter designed in step g2; and
g5. adding the noise contribution to at least one of the determined amount of translation and the determined amount of rotation.

10. A scanning inkjet printing assembly, the scanning inkjet printing assembly comprising
a print surface for holding a recording medium;
a guide structure extending over the print surface, the guide structure and the recording medium being moveable relative to each other in a transport direction;
a carriage moveably supported on the guide structure and supporting at least one inkjet print head, wherein the carriage is moveable over the print surface in a scanning direction for applying droplets of a liquid to the recording medium to form a swath of printed dots on the recording medium, the scanning direction being transverse to the transport direction;
a sub-carriage supported by the carriage, the sub-carriage being moveable relative to the carriage at least in the transport direction and rotatable around a rotation axis perpendicular to the print surface;
a control unit operatively coupled to the carriage and the sub-carriage for controlling the movement of the carriage and the sub-carriage; and
a sensor unit operatively coupled to the control unit for detecting a position of a previously applied swath of printed dots; and
wherein the control unit is configured to control the sub-carriage to adapt the swath being applied to the previously applied swath by translating the sub-carriage relative to the carriage in the transport direction and rotating the sub-carriage relative to the carriage around the rotation axis in accordance with the method according to claim 1.

* * * * *